(12) United States Patent
Piederriere et al.

(10) Patent No.: US 11,738,707 B2
(45) Date of Patent: Aug. 29, 2023

(54) SEAT BACKREST COMPRISING AN OUTER AIRBAG MODULE

(71) Applicant: Faurecia Sièges d'Automobile, Nanterre (FR)

(72) Inventors: Jean-Yves Piederriere, Angerville (FR); Mathieu Cluet, Etampes (FR); Benoit Gazaniol, Arpajon (FR); Fabrice Charras, Montrouge (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 17/853,288

(22) Filed: Jun. 29, 2022

(65) Prior Publication Data

US 2022/0410834 A1 Dec. 29, 2022

(30) Foreign Application Priority Data

Jun. 29, 2021 (FR) .................................... 21 06975

(51) Int. Cl.
*B60R 21/207* (2006.01)
*B60R 21/215* (2011.01)

(52) U.S. Cl.
CPC .......... *B60R 21/207* (2013.01); *B60R 21/215* (2013.01)

(58) Field of Classification Search
None
See application file for complete search history.

(56) References Cited

U.S. PATENT DOCUMENTS

| 5,806,882 A | 9/1998 | Stein et al. | |
| 10,773,674 B2 * | 9/2020 | Hioda | B60N 2/4235 |
| 11,225,219 B2 * | 1/2022 | Kobayashi | B60R 21/2176 |
| 2015/0076885 A1 | 3/2015 | Stone et al. | |
| 2021/0394698 A1 * | 12/2021 | Tanabe | B60R 21/207 |

FOREIGN PATENT DOCUMENTS

| DE | 19853469 A1 | 6/1999 | |
| DE | 102004059277 A1 | 8/2006 | |
| EP | 0861761 A1 | 9/1998 | |
| JP | H10166986 A | 6/1998 | |
| JP | 2000289510 A | 10/2000 | |
| JP | 2003182425 A | 7/2003 | |
| JP | 2004017927 A | 1/2004 | |
| JP | 3794306 B2 | 7/2006 | |
| JP | 5039344 B2 * | 10/2012 | B60N 2/58 |
| JP | 2015058884 A | 3/2015 | |

OTHER PUBLICATIONS

French Search Report corresponding to French Application No. FR 2106975, dated Feb. 22, 2022, 3 pages.
Translation of JP 3794306 obtained from Japan Platform for Patent Information (J-PlatPat) (the patent search service provide on the Japanese Patent Office website), https://www.j-platpat.inpit.go.jp/p0200, accessed Mar. 8, 2023.

\* cited by examiner

*Primary Examiner* — Faye M Fleming
(74) *Attorney, Agent, or Firm* — Reising Ethington P.C.

(57) ABSTRACT

A seat backrest having a frame and a cover extending around at least part of the frame, the cover defining at least part of the outer surface of the backrest. The seat backrest includes an airbag module, having a housing receiving an airbag, that is attached to the frame in an attachment area. At least in the attachment area, the cover is in direct contact with the frame and extends between the frame and the housing of the airbag module. The housing is attached to the frame through the cover and extends entirely to the side of the outer surface of the backrest.

11 Claims, 3 Drawing Sheets

SEAT BACKREST COMPRISING AN OUTER AIRBAG MODULE

TECHNICAL FIELD

The present invention relates to a seat backrest, of the type comprising a frame and a cover extending around at least part of the frame, said cover defining at least part of the outer surface of the backrest, an airbag module, comprising a housing receiving an airbag, being attached to said frame in an attachment area.

BACKGROUND

Such a backrest typically comprises a foam body mounted on an internal frame, with a cover encasing the foam body and defining the visible outer surface of the backrest. A side airbag module can be integrated into the foam body and arranged to deploy on one side of the seat. The housing of the airbag module is generally attached to the frame and a layer of foam from the body covers the housing, this layer of foam being covered by the cover.

Such an arrangement allows the airbag module to be seamlessly integrated into the seat, as it is not visible under the cover and does not affect the feel of the seat due to the foam layer extending between the housing and the cover.

However, such a backrest requires a large amount of material, especially foam to encapsulate the frame, which increases the backrest's size, mass and manufacturing costs and also $CO_2$ consumption. In addition, special measures must be taken to allow the airbag to deploy outwards from the seat, such as the addition of a breakage zone in the foam layer and a tearaway zone in the cover opposite the housing.

SUMMARY

It is an aim of the invention to overcome these disadvantages by providing a seat backrest requiring less material and having an easier-to-deploy airbag.

To this end, the invention relates to a backrest of the aforementioned type, wherein, at least in the attachment area, the cover is in direct contact with the frame and extends between said frame and the housing of the airbag module, said housing being attached to the frame through the cover and extending entirely to the side of the outer surface of the backrest.

By providing a cover extending directly over the frame and an airbag module extending outside the cover, the amount of foam used in the backrest can be reduced as no foam layer is provided at least in the attachment area. In addition, deployment of the airbag is facilitated by the fact that the housing opens directly onto the outside of the backrest. It is therefore not necessary to provide any special arrangement of the cover in the attachment area to allow this deployment.

The backrest according to various embodiments of the invention may further comprise the following features, taken alone or in any combination that is technically possible:
- the housing of the airbag module is a casing comprising an inner casing part and an outer casing part, the inner casing part being attached to the frame in the attachment area and the outer casing part being mounted on the inner casing part, the inner casing part and the outer casing part defining between them an airbag receiving volume;
- the outer casing part comprises at least one flap movable between a closed position, in which the flap closes the airbag-receiving volume, and an open position, in which the flap opens up a passage to the outside of the backrest for the deployment of the airbag;
- the frame forms a framework delimited by at least two opposite legs, said framework defining an outer face and an inner face extending on either side of the frame, the cover being in direct contact with a part of the two opposite legs of the frame and being stretched around the two legs on the side of the outer face;
- a foam body is mounted on the frame on the inner face, the cap extending over said foam body;
- the attachment area extends over a main wall of one of the legs of the frame, said main wall extending between the outer face and the inner face of the frame;
- the housing of the airbag module is attached to the frame by at least one attachment element, said attachment element comprising a rod, in particular a threaded rod, extending between the housing and the frame through the cover, said rod being attached to the frame;
- the cover is held on the frame in the attachment area by compression between the housing of the airbag module and the frame so that the cover is not attached directly to the housing;
- the housing of the airbag module is attached to the frame by a single attachment element comprising a rod receiving the airbag at one end in the housing and receiving a bolt at its other end on the frame side;
- the cover is in direct contact with the housing, in particular over the entire length of the housing in a longitudinal direction.

According to another aspect, the invention also relates to a vehicle seat comprising such a backrest.

BRIEF DESCRIPTION OF THE DRAWINGS

Other aspects and advantages of the invention will become apparent upon reading the following description, given as an example and referencing the attached drawings, in which.

DETAILED DESCRIPTION

Figure 1:
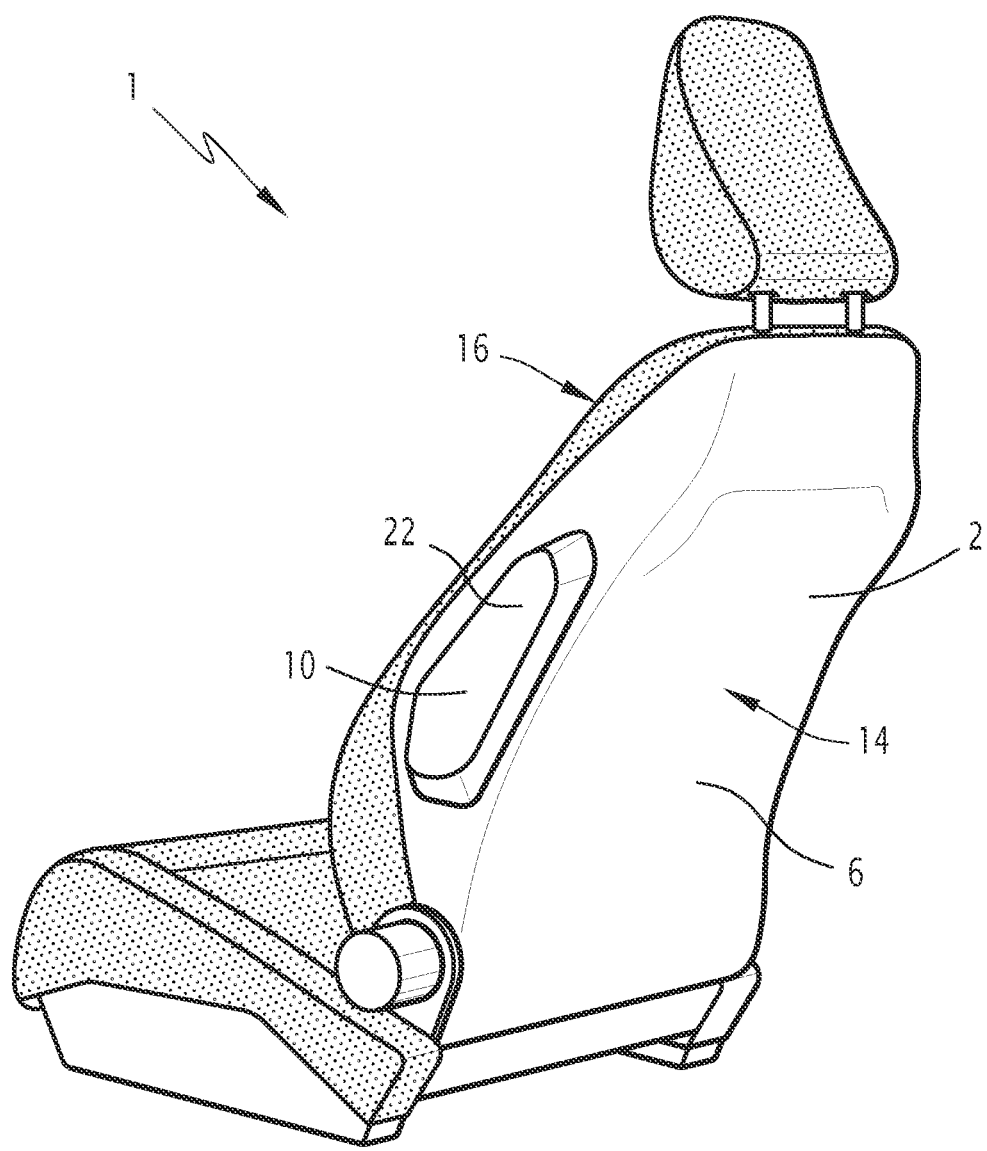
FIG. 1 is a diagram in perspective view of a seat comprising a backrest according to an embodiment of the invention.

With reference to FIG. 1, a vehicle seat 1, such as a motor vehicle seat, comprising at least one backrest 2 is described.

Figure 2:
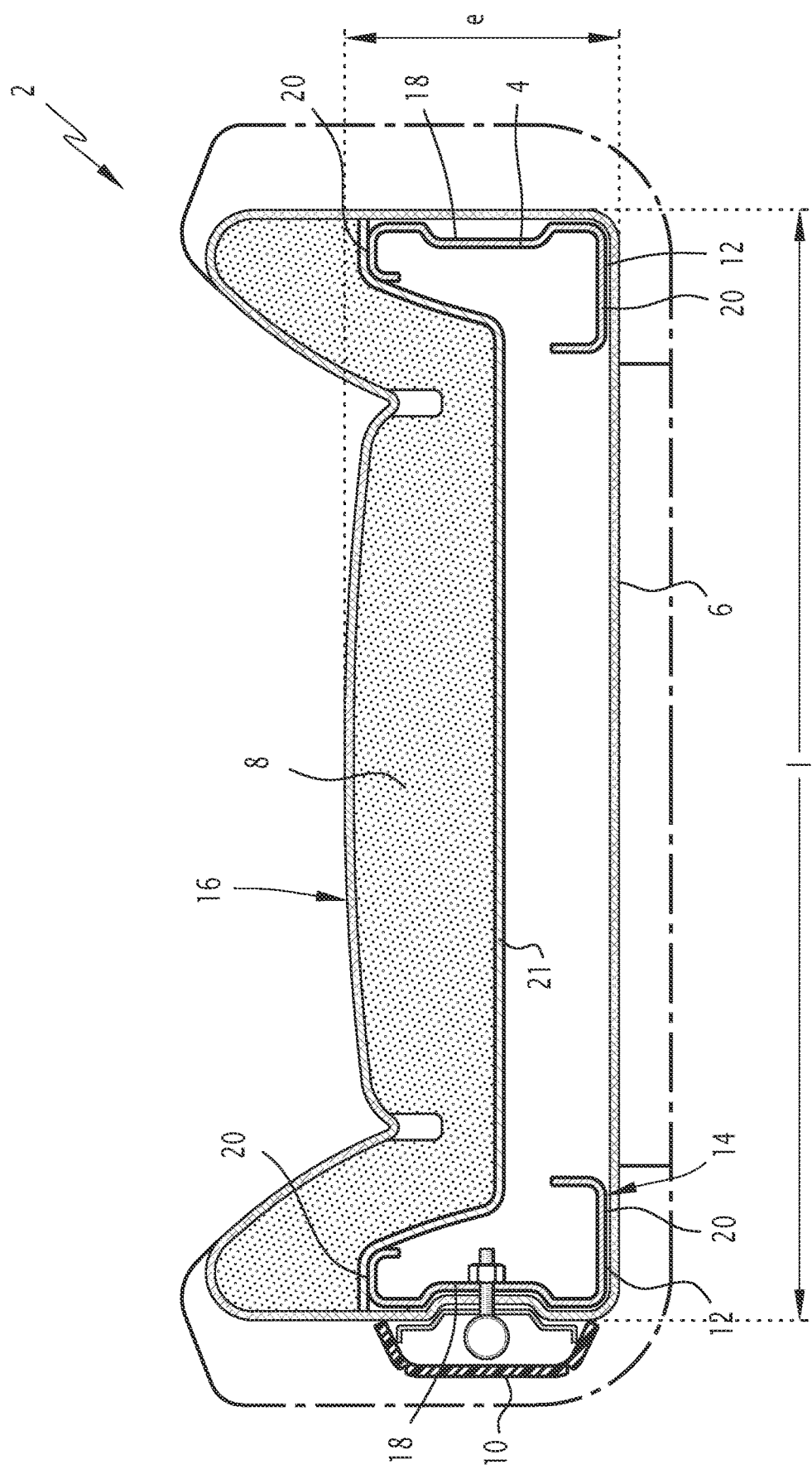
FIG. 2 is a diagram in cross-section view of the backrest of FIG. 1.

As shown in FIG. 2, the backrest 2 comprises a frame 4, a cover 6, a foam body 8 and an airbag module 10.

The frame 4 is formed, for example, by metal profiles joined together and forms a support framework for the other elements of the seat backrest 2. To this end, the frame 4 comprises at least two legs 12 extending in the elevation direction of the backrest 2, corresponding to the height thereof. The legs 12 are spaced from each other in a transverse direction substantially perpendicular to the elevation direction and corresponding to the width I of the backrest 2, as shown in FIG. 2. In a known way, the legs 12 are for example connected to each other by a lower and an upper crosspiece (not shown) extending in the transverse direction at the lower and upper ends of the legs 12 and spaced apart from each other in the elevation direction.

The frame 4 defines an outer face 14 and an inner face 16 extending on either side of the framework in a longitudinal direction substantially perpendicular to the elevation direction and the transverse direction and corresponding to the thickness e of the backrest 2, as shown in FIG. 2. The outer face 14 corresponds, for example, to the back of the backrest, which faces the rear of the vehicle when the seat is facing the front of the vehicle, and the inner face 16 extends, for example, to the side of a passenger-receiving surface, on which a passenger's back rests when he or she is sitting on the seat.

Figure 3:
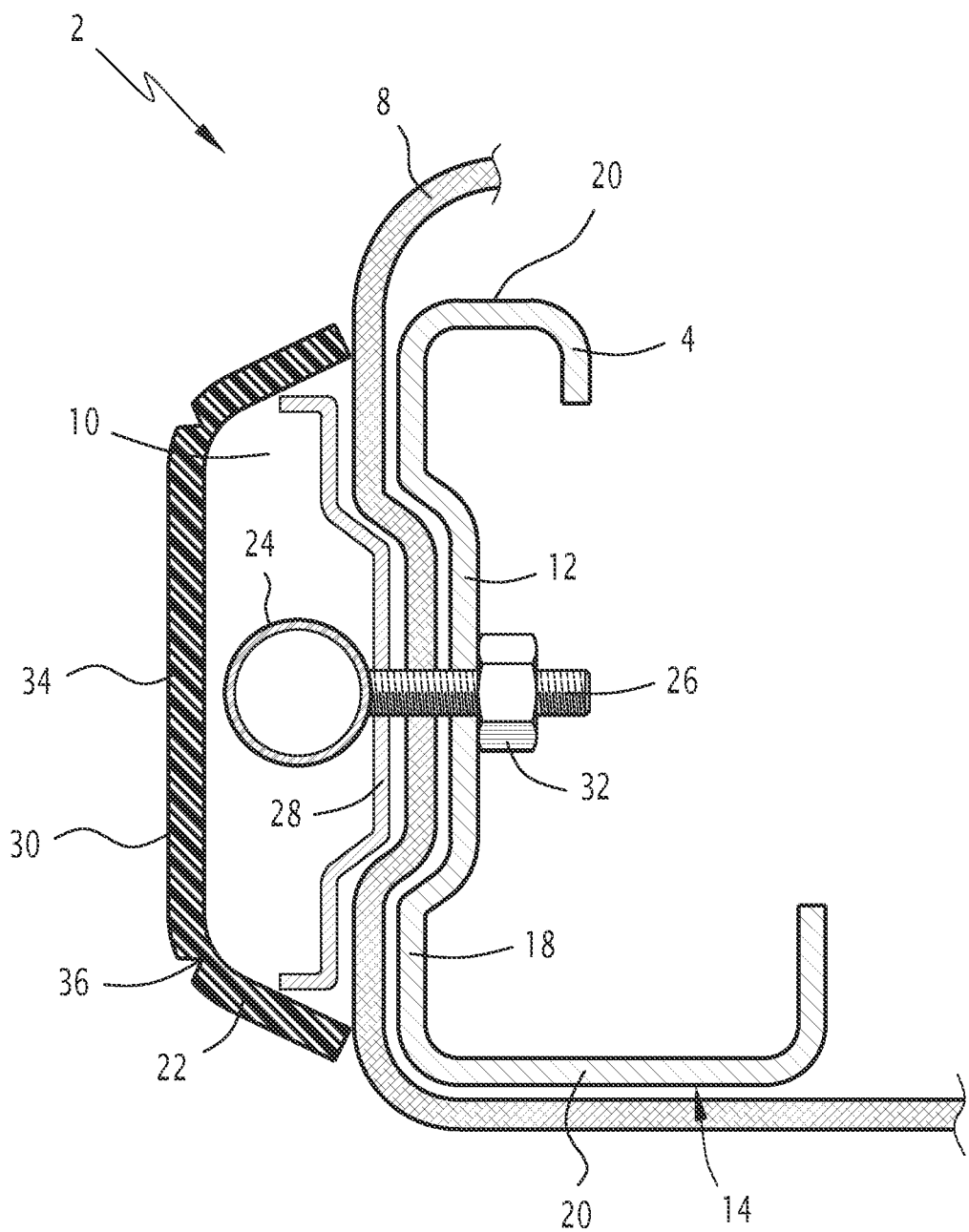
FIG. 3 is a diagram in perspective view of a part of the backrest of FIGS. 1 and 2.

In the embodiment shown in FIGS. 2 and 3, each leg 12 has a U-shaped cross-section and comprises a main wall 18 forming the base of the U and two side walls 20 forming the legs of the U and extending on either side of the main wall 18. The main wall 18 extends in the longitudinal direction between the outer face 14 and the inner face 16 of the frame 4, while one side wall 20 forms an edge of the outer face 14 and the other side wall 20 forms an edge of the inner face 16 in the transverse direction. The cavities of the legs 12, defined for each leg 12 by the main wall 18 and the side walls 20 thereof, face each other. In other words, the main walls 18 of the legs 12 form the edges of the frame in the transverse direction.

The frame 4 forms a support structure for the other parts of the backrest. That is, the other parts, such as the foam body 8, the cover 6 and the airbag module 10, are mounted on the frame 4. Other parts can be mounted on the frame 4, such as a headrest and an articulated linkage to the seat.

The foam body 8 is attached to the frame 4 on the side of the inner face 16 of the frame, as shown in FIG. 2. In particular, the foam body 8 is supported on a deflection mat 21, which is formed, for example, by metal laths and is mounted on the frame 4 between the legs 12 on the side of the inner face 16 of the frame. The foam body 8 forms a suitable cushion for the passenger when sitting on the seat. For this purpose, the foam body 8 may be of any shape suitable for the comfort of the passenger. For example, the foam body 8 covers the entire framework formed by the frame 4 on the inner face 16, while the outer face 14 is not covered by the foam body 8. The foam body 8 is, for example, attached to the legs 12 so that it covers the side walls 20 extending from the inner face 16. For each leg 12, the foam body 8 may optionally extend over a portion of the main wall 18 adjacent to the side wall 20 on the side of the inner face 16, but the majority of the main wall 18 is advantageously unfoamed, as shown in FIG. 2.

Thus, on the side of the outer face 14 and on the sides of the backrest 2, the backrest 2 is devoid of a foam body, thus reducing the size of the backrest 2 and the amount of material required to make the backrest 2 and the surface of the cover 6 enclosing the backrest 1, as will be described later. In FIG. 2, the foam body parts usually provided on a prior art backrest are shown in dotted lines. As can be seen, the width I of the backrest 2 in the transverse direction is reduced compared to that of the backrest of the prior art. In particular, a reduction in width in the range of 40 to 60 mm can be achieved. Similarly, the thickness e of the backrest 2 in the longitudinal direction is reduced compared to that of the backrest of the prior art. In particular, a reduction in thickness of between 10 and 30 mm, for example 15 mm, can be achieved.

The cover 6 covers the frame 4 and the foam body 8 so as to form the outer surface of the backrest 2, i.e. the part of the backrest 2 that is visible from the vehicle interior. The cover 6 therefore gives the backrest 2 its look and feel and can be made of any suitable material. The cover can be made of textile material or skin of natural material, such as leather, or synthetic.

As shown in FIG. 2, on the inner face 16, the cover extends over and covers the foam body 8. In a known way, the cover 6 is attached to the foam body 8 by return means. In the areas of the frame 4 without a foam body, the cover 6 is in direct contact with the frame 4. "Direct contact" means that there is no intermediate layer extending between the cover 6 and the frame 4. More particularly, as shown in FIG. 3, the cover 6 is in direct contact with the majority of the main walls 18 and on the side walls 20 on the side of the outer surface 14 of the legs 12 of the frame 4. In other words, on the sides and on the outer face 14, the cover 6 is stretched directly around the frame formed by the frame 4, in particular around the two legs 12, as shown in solid lines in FIG. 2. In one embodiment, the cover 6 is in direct contact with the main walls 18 of both legs 12 over the entire length of the main walls 18, measured in the longitudinal direction.

An attachment area is provided on at least one of the legs 12 of the frame 4 for the attachment of the airbag module 10. In particular, the attachment area extends over a portion of the main wall 18 of the leg 12 at the location intended for deployment of a side airbag. The airbag module 10 is therefore attached to the frame 4 in the attachment area. The attachment between the airbag module 10 and the frame 4 is made through the cover 6 so that the airbag module 10 extends entirely to the side of the outer surface of the backrest 2, defined by the cover 6, as shown in FIGS. 1 to 3. It should be noted that there is no direct attachment between the cover 6 and the airbag module 10, as will be described in more detail later.

The airbag module 10 comprises a housing 22 which accommodates an airbag 24 in a folded state (not shown). The housing 22 is attached to the frame 4 by at least one attachment element 26 extending through the cover 6, as shown in FIG. 3.

In one embodiment, the housing 22 is formed by a casing, for example made of rigid plastic material. More particularly, the casing is for example formed by an inner casing part 28 and an outer casing part 30 delimiting between them a volume for receiving the airbag 24. As shown in FIG. 3, the inner casing part 28 is attached to the frame by the attachment element 26 and the outer casing part 30 is attached to the inner casing part 28. The attachment element 26 comprises a rod attached to the inner casing part 28, passing through the cover 6 and the main wall 18 of a leg 12 in the attachment area and being for example bolted to the frame 4 at one end of the rod by a bolt 32. The other end of the rod extending into the interior of the housing accommodates the airbag 24, for example. The outer casing part 30 is mounted on the inner casing part 28, for example by clipping onto the inner casing part 28. It is understood that several attachment elements 26 can be provided, especially depending on the dimensions of the housing 22. However, in one embodiment, the housing 22 is attached to the frame by a single attachment element 26. Alternatively, the housing 22 is formed by a flexible bag, for example made of fabric.

In the attachment area, the cover 6 is in direct contact with the housing 22, for example over its entire length, measured in the longitudinal direction. In the attachment area, the cover 6 is thus held on the frame by compression between the housing 22 and the frame 4. In other words, in the attachment area, the cover 6 is sandwiched between the inner part 28 of the housing 22 and the main wall 18 of the leg 12 so that there is no need to provide an attachment between the cover 6 and the housing 22 of the airbag module 10.

In the case of a housing 22 formed by a two-part casing, the outward deployment of the airbag 24 takes place through the outer casing part 30. To that end, the outer casing part 30 comprises at least one flap 34 movable between a closed position, in which the flap 34 closes the airbag 24 receiving volume, and an open position (not shown), in which the flap 34 opens up a passage to the outside of the backrest 2 for the deployment of the airbag 24. The flap 34 is, for example, integral with the remainder of the outer casing portion 30 via at least one break line 36 arranged to break and allow the flap 34 to move to the open position under the force generated by the deployment of the airbag 24. The break line 36 is for example formed by a material weakening in the outer casing part 30. In the case of a flexible bag, the break line is for example a tear line of the flexible bag.

As the airbag module 10 extends entirely outside the cover 6, there is no need to provide a break line in the cover 6 or in the foam body, as is usually the case for this type of airbag module. This makes the deployment of the airbag 24 easier and does not depend on the nature of the cover 6. In addition, the production of the backrest 2 is also simplified.

The backrest 2 saves material and simplifies the construction of the backrest 2. It is understood that this result can be achieved if the cover 6 is applied directly to the frame, at least in the attachment area of the airbag module 10, so that it extends between the housing 22 of the airbag module 10 and the frame 4 in the attachment area. Thus, the foam body 8 may extend beyond the inner face 14 of the frame, for example over a portion of the main wall 18 adjacent to the side wall 20 on the inner face side, as long as it does not extend over the attachment area.

The backrest 2 retains a satisfactory look and feel. For this purpose, the housing 22 of the airbag module 10, which is visible as it extends from the side of the outer surface of the cover 6, can be shaped to give the backrest 2 a particular appearance. Providing the airbag module 10 externally simplifies the deployment of the airbag 24 and thus ensures its proper functioning.

The invention claimed is:

1. A seat backrest comprising:
   a frame;
   a cover extending around at least part of the frame, said cover defining at least part of the outer surface of the backrest; and
   an airbag module, comprising a housing receiving an airbag, being attached to said frame in an attachment area;
   wherein, at least in the attachment area, the cover is in direct contact with the frame and extends between the frame and the housing of the airbag module, the housing being attached to the frame through the cover and extending entirely on the side of the outer surface of the backrest.

2. The seat backrest according to claim 1, wherein the housing of the airbag module is a casing comprising an inner casing part and an outer casing part, the inner casing part being attached to the frame in the attachment area and the outer casing part being mounted on the inner casing part, the inner casing part and the outer casing part defining an airbag-receiving volume between them.

3. The seat backrest according to claim 2, wherein the outer casing part comprises at least one flap movable between a closed position, in which the flap closes the airbag-receiving volume, and an open position, in which the flap opens up a passage to the outside of the backrest for the deployment of the airbag.

4. The seat backrest according to claim 1, in which the frame forms a framework delimited by at least two opposite legs, said framework defining an outer face and an inner face extending on either side of the frame, the cover being in direct contact with part of the two opposite legs of the frame and being stretched around the two legs on the side of the outer face.

5. The seat backrest according to claim 4, wherein a foam body is mounted on the frame on the side of the inner face, the cover extending over said foam body.

6. The seat backrest according to claim 4, wherein the attachment area extends on a main wall of one of the legs of the framework, said main wall extending between the outer face and the inner face of the framework.

7. The seat backrest according to claim 1, wherein the housing of the airbag module is attached to the frame by at least one attachment element, said attachment element comprising a threaded rod extending between the housing and the frame through the cover, said rod being attached to the frame.

8. The seat backrest according to claim 7, wherein the cover is held on the frame in the compression attachment area between the housing of the airbag module and the frame so that the cover is not attached directly to the housing.

9. The seat backrest according to claim 7, wherein the housing of the airbag module is attached to the frame by a single attachment element comprising a rod receiving at one end in the housing the airbag and receiving at its other end on the frame side a bolt.

10. The seat backrest according to claim 1, wherein the cover is in direct contact with the housing along the entire length of the housing in a longitudinal direction.

11. The seat backrest according to claim 1, wherein the housing receiving the airbag is formed at least in part by an outer casing part delimiting a volume for receiving the airbag.

* * * * *